(12) United States Patent
Guettinger et al.

(10) Patent No.: US 9,915,300 B2
(45) Date of Patent: Mar. 13, 2018

(54) SYNCHRONIZED WEDGE CLUTCH WITH DETENT

(71) Applicant: Schaeffler Technologies AG & Co. KG, Herzogenaurach (DE)

(72) Inventors: Jan Guettinger, Achern (DE); Brian Lee, York, SC (US)

(73) Assignee: Schaffler Technologies AG & Co. KG, Herzogenaurach (DE)

( * ) Notice: Subject to any disclaimer, the term of this patent is extended or adjusted under 35 U.S.C. 154(b) by 357 days.

(21) Appl. No.: 14/871,003

(22) Filed: Sep. 30, 2015

(65) Prior Publication Data

US 2017/0089410 A1 Mar. 30, 2017

(51) Int. Cl.
| | |
|---|---|
| *F16D 41/063* | (2006.01) |
| *F16D 11/16* | (2006.01) |
| *F16D 23/02* | (2006.01) |
| *F16D 47/04* | (2006.01) |
| *F16D 41/06* | (2006.01) |

(52) U.S. Cl.
CPC .......... *F16D 41/063* (2013.01); *F16D 11/16* (2013.01); *F16D 23/02* (2013.01); *F16D 47/04* (2013.01); *F16D 2041/0605* (2013.01)

(58) Field of Classification Search
None
See application file for complete search history.

(56) References Cited

U.S. PATENT DOCUMENTS

| | | | |
|---|---|---|---|
| 2014/0231208 A1* | 8/2014 | Lee | F16D 21/00 192/48.5 |
| 2015/0060223 A1* | 3/2015 | Ohr | F16D 41/082 192/45.1 |
| 2017/0089405 A1* | 3/2017 | Lee | F16D 15/00 |

* cited by examiner

*Primary Examiner* — Jacob S. Scott

(57) ABSTRACT

A wedge clutch, including: an outer carrier; a first clutch plate non-rotatably connected to the outer carrier; a wedge clutch plate; a hub radially inward of the outer carrier; an engagement assembly including a pin partially disposed within the hub and in contact with the wedge clutch plate; and an actuator. For a first synchronization stage for closing the wedge clutch: the actuator is arranged to clamp the first clutch plate and the wedge clutch plate; and a first portion of the pin extending radially outward beyond an outer circumference of the hub is arranged to transmit torque between the hub and the carrier. For a second synchronization stage for closing the wedge clutch: the hub or the wedge clutch plate are arranged to circumferentially displace with respect to each other; and the wedge clutch plate is arranged to displace the pin radially inward.

20 Claims, 14 Drawing Sheets

SYNCHRONIZED WEDGE CLUTCH WITH DETENT

TECHNICAL FIELD

The present disclosure relates generally to a wedge clutch using a combination of clutch plates and wedge clutch plates, a single actuator, and spring-biased pins in a hub. In particular, the spring-biased pins are used to non-rotatably connect the hub and the wedge clutch plates in a first stage for closing the clutch and to enable relative rotation between the hub and the wedge clutch plates for a second stage for closing the clutch.

BACKGROUND

FIG. 15 is an exploded view of prior art wedge clutch 210. Clutch 210 includes carrier 212, clutch plates 214, wedge clutch plates 216, hub 218, pins 220, plate 222 and plate 224. Pins 220 pass through openings 226 in plates 214 and 216 and are connected to plates 222 and 224 via openings 228 and 230, respectively. Pins 220 include portions 220A and portions 220B. The outside diameter of portions 220A is less than the outside diameter of portion 220B. Plates 214 are non-rotatably connected to carrier 212 via protrusions 232 in slots 234 in carrier 212. Plates 222 and 224 are non-rotatably connected to hub 218. Plates 216 include ramps 236 extending radially inward along circumferential direction CD1. Hub 2186 include ramps 238 extending radially outward in circumferential direction CD2 opposite direction CD1.

For a first synchronization stage, a first actuator (not shown) displaces pins 220 such that portions 220B are disposed in openings 226. The outer diameter of portions 220B is such that portions 220B essentially fill openings 226 and prevent rotation of plates 216 with respect to hub 218. A second actuator (not shown) clamps plates 214 and 216 such that torque received by hub 218, for example, is transmitted to carrier 212 via plates 214 and 216.

For a second synchronization stage, the first actuator displaces the pins such that portions 220A are disposed in openings 226 and the second actuator is de-activated to enable rotation between plates 216 and hub 218. Due to the smaller outer diameter of portions 220A: pins 220 are able to rotate in openings 226; plates 216 and hub 218 are able to rotate with respect to each other; and ramps 236 and 238 slide along each other to displace plates 216 radially outward. The radially outward displacement of plates 216 non-rotatably connects carrier 212 and hub 218.

The use of two actuators increases the cost, complexity, size, and energy requirements of clutch 210 and reduces the robustness and reliability of clutch 210.

SUMMARY

The present disclosure broadly describes a wedge clutch, including: an outer carrier; a first clutch plate non-rotatably connected to the outer carrier; a wedge clutch plate; a hub radially inward of the outer carrier; an engagement assembly including a pin partially disposed within the hub and in contact with the wedge clutch plate; and an actuator. For a first synchronization stage for closing the wedge clutch: the actuator is arranged to clamp the first clutch plate and the wedge clutch plate; and a first portion of the pin extending radially outward beyond an outer circumference of the hub is arranged to transmit torque between the hub and the carrier. For a second synchronization stage for closing the wedge clutch: the hub or the wedge clutch plate are arranged to circumferentially displace with respect to each other; and the wedge clutch plate is arranged to displace the pin radially inward.

The present disclosure broadly describes a wedge clutch, including: an axis of rotation; an outer carrier; a first clutch plate non-rotatably connected to the outer carrier; a wedge clutch plate; a hub radially inward of the outer carrier; and an engagement assembly including a pin non-rotatably connected to the hub and engaged with the wedge clutch plate and an actuator arranged to, for a first synchronization stage for closing the wedge clutch, clamp the first clutch plate and the wedge clutch plate. During the first synchronization stage, the pin is arranged to non-rotatably connect the hub and the wedge clutch plate. For a second synchronization stage for closing the wedge clutch, the wedge clutch plate is arranged to apply a first force urging the pin radially inward.

The present disclosure broadly describes a wedge clutch, including: an axis of rotation; an outer carrier; a first clutch plate non-rotatably connected to the outer carrier; a wedge clutch plate including a notch in an inner circumference for the wedge clutch plate; a hub radially inward of the outer carrier and including a slot, axially aligned, in an outer circumference for the hub; and an engagement assembly including a pin including at least a portion disposed in the slot; a resilient element disposed in the slot and urging the pin radially outward; and an actuator arranged to for a first synchronization stage for closing the wedge clutch, clamp the first clutch plate and the wedge clutch plate so that the first clutch plate and the wedge clutch plate transmit torque between the hub and the carrier. For the first synchronization stage, the pin is disposed in the notch to non-rotatably connect the hub and the wedge clutch plate. For a second synchronization stage for closing the wedge clutch: the wedge plate is arranged to apply a force, in a circumferential direction, to a portion of the pin radially outward of the outer circumference for the hub; the force is arranged to displace the pin radially inward; and as the pin displaces radially inward, the wedge clutch plate is arranged to circumferentially displace with respect to the hub to non-rotatably connect to the hub and the carrier.

BRIEF DESCRIPTION OF THE DRAWINGS

The nature and mode of operation of the present disclosure will now be more fully described in the following detailed description of the present disclosure taken with the accompanying figures, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Unless defined otherwise, all technical and scientific terms used herein have the same meaning as commonly understood to one of ordinary skill in the art to which this present disclosure belongs. It should be appreciated that the term "substantially" is synonymous with terms such as "nearly", "very nearly", "about", "approximately", "around", "bordering on", "close to", "essentially", "in the neighborhood of", "in the vicinity of", etc., and such terms may be used interchangeably as appearing in the specification and claims. It should be appreciated that the term "proximate" is synonymous with terms such as "nearby", "close", "adjacent", "neighboring", "immediate", "adjoining", etc., and such terms may be used interchangeably as appearing in the specification and claims.

Figure 1:
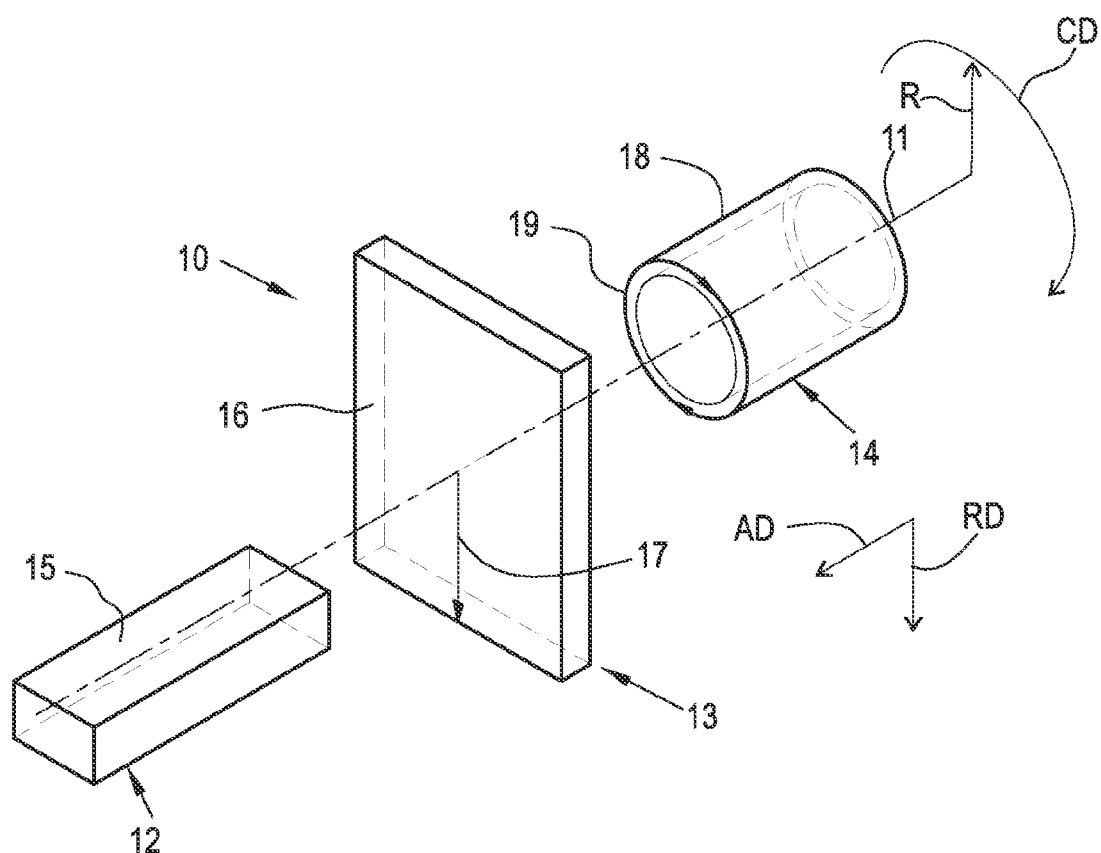
FIG. 1 is a perspective view of a cylindrical coordinate system demonstrating spatial terminology used in the present application.

FIG. 1 is a perspective view of cylindrical coordinate system 10 demonstrating spatial terminology used in the present application. The present application is at least partially described within the context of a cylindrical coordinate system. System 10 includes longitudinal axis 11, used as the reference for the directional and spatial terms that follow. Axial direction AD is parallel to axis 11. Radial direction RD is orthogonal to axis 11. Circumferential direction CD is defined by an endpoint of radius R (orthogonal to axis 11) rotated about axis 11.

To clarify the spatial terminology, objects 12, 13, and 14 are used. An axial surface, such as surface 15 of object 12, is formed by a plane co-planar with axis 11. Axis 11 passes through planar surface 15; however any planar surface co-planar with axis 11 is an axial surface. A radial surface, such as surface 16 of object 13, is formed by a plane orthogonal to axis 11 and co-planar with a radius, for example, radius 17. Radius 17 passes through planar surface 16; however any planar surface co-planar with radius 17 is a radial surface. Surface 18 of object 14 forms a circumferential, or cylindrical, surface. For example, circumference 19 is passes through surface 18. As a further example, axial movement is parallel to axis 11, radial movement is orthogonal to axis 11, and circumferential movement is parallel to circumference 19. Rotational movement is with respect to axis 11. The adverbs "axially," "radially," and "circumferentially" refer to orientations parallel to axis 11, radius 17, and circumference 19, respectively. For example, an axially disposed surface or edge extends in direction AD, a radially disposed surface or edge extends in direction R, and a circumferentially disposed surface or edge extends in direction CD.

Figure 2:
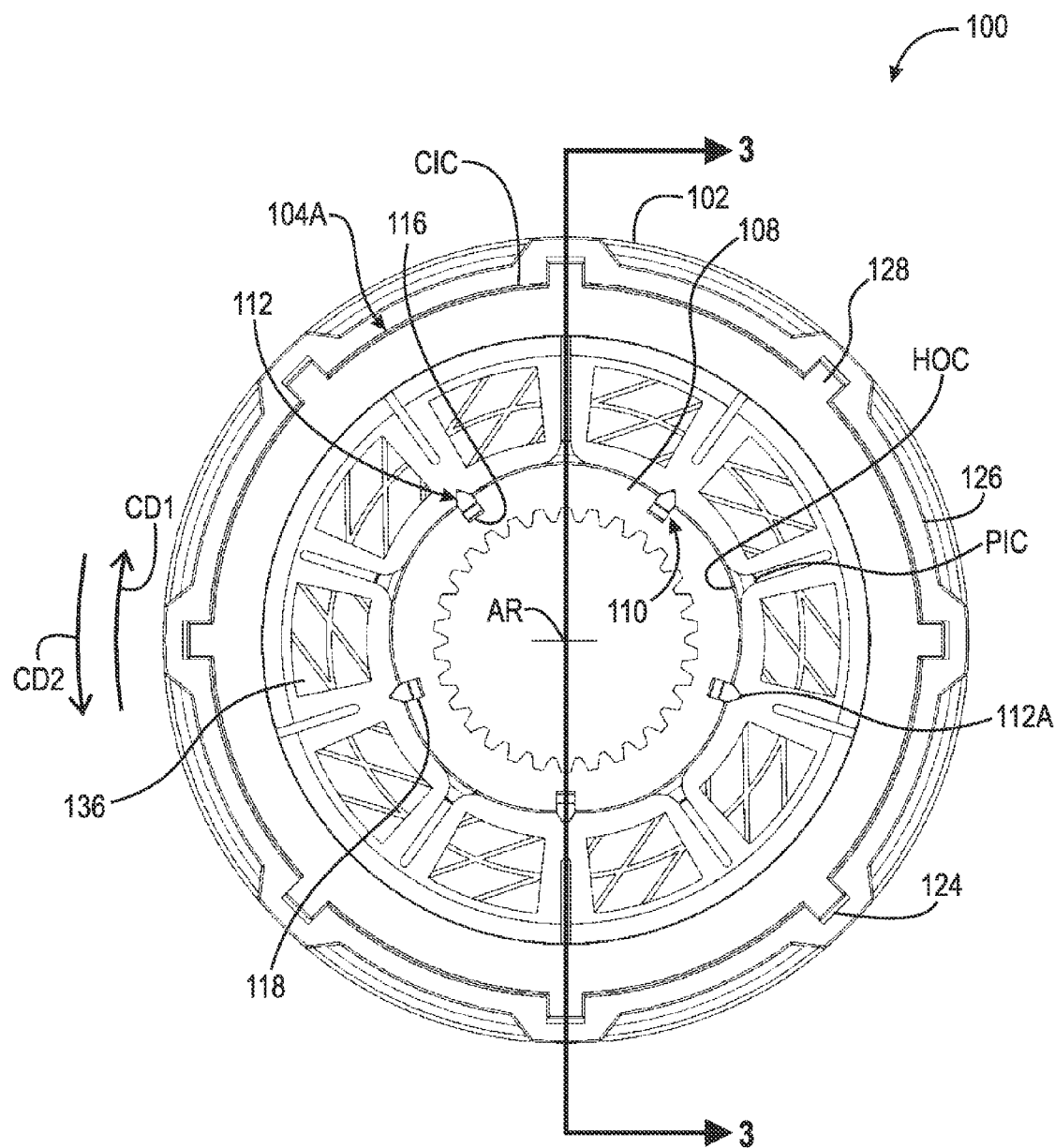
FIG. 2 is a cut-away front view of a wedge clutch with polygonal radial torsion pins.

FIG. 2 is a cut-away front view of wedge clutch 100 with polygonal radial torsion pins.

Figure 3:
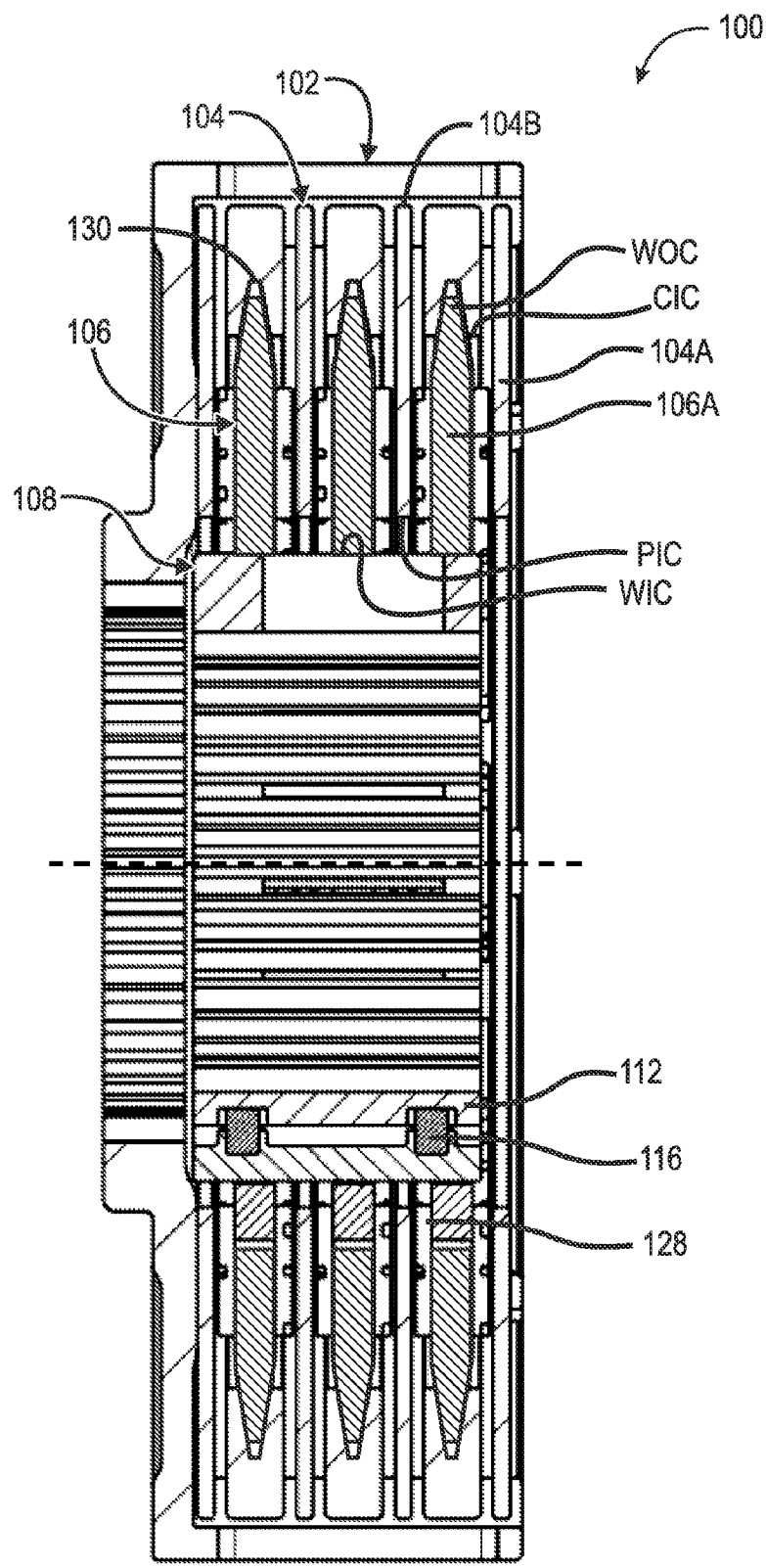
FIG. 3 is a cross-sectional view generally along line 3-3 in FIG. 2 without the cut-away.

FIG. 3 is a cross-sectional view generally along line 3-3 in FIG. 2 without the cut-away.

Figure 4:
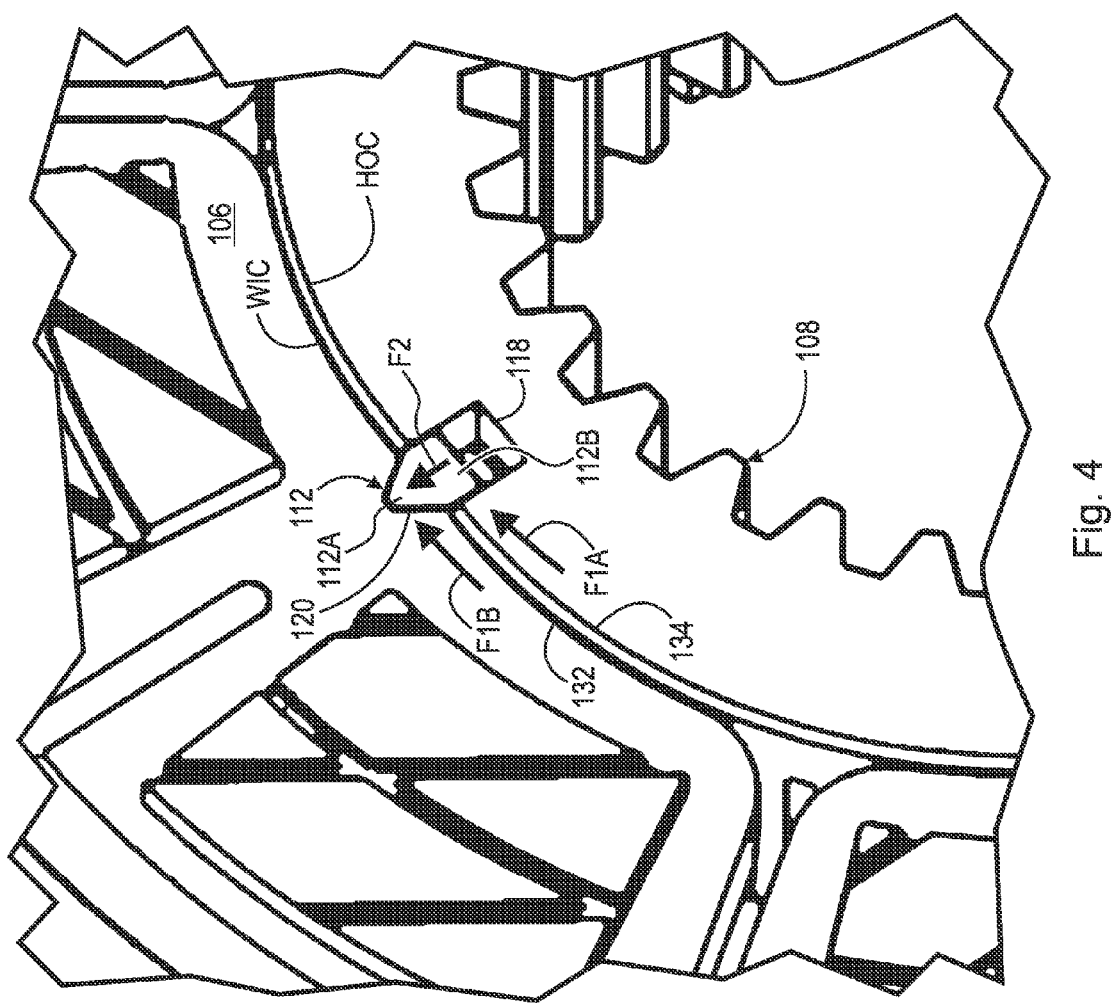
FIG. 4 is a partial front perspective view of the wedge clutch in FIG. 2.

FIG. 4 is a partial front perspective view of wedge clutch 100 in FIG. 2.

Figure 5:
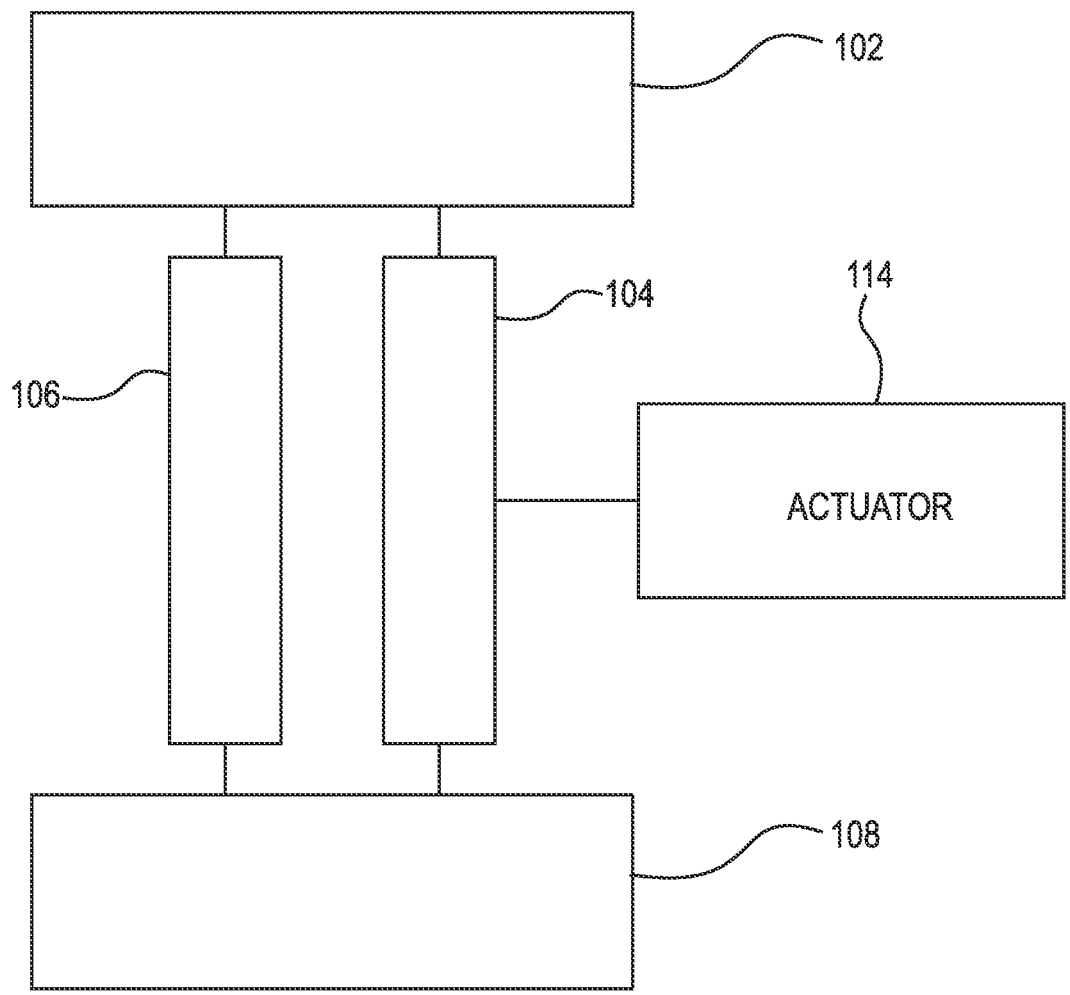
FIG. 5 is a block diagram of wedge clutch 100 in FIG. 2 shown an actuator.

FIG. 5 is a block diagram of wedge clutch 100 in FIG. 2 showing an actuator. The following should be viewed in light of FIGS. 2 through 5. Wedge clutch 100 includes: axis of rotation AR; outer carrier 102; at least one clutch plate 104 non-rotatably connected to outer carrier 102; at least one wedge clutch plate 106; hub 108 radially inward of outer carrier 102; and engagement assembly 110. Plates 104 and 106 are radially disposed between carrier 102 and hub 108. In an example embodiment, clutch 100 includes respective pluralities of plates 104 and 106. The discussion that follows is directed to pluralities of plates 104 and 106 unless noted otherwise. In an example embodiment (not shown), clutch 100 includes only one plate 104 and/or only one plate 106. By "non-rotatably" connected elements we mean: when any one of the elements rotate, the other elements rotate as well; and relative rotation between the non-rotatably connected elements is not possible. That is, the connected elements are essentially a monolithic structure with respect to rotation. Although a particular number and ratio of plates 104 and 106 are shown in the example of FIG. 2, it should be understood that other numbers and ratios of plates 104 and 106 are possible.

In FIG. 2, clutch plate 104A has been cut-away radially inward of inner circumference CIC of carrier 102 in order to show plate 106A. Inner circumference PIC of plate 104B can be seen in FIG. 2.

Assembly 110 includes pin 112 partially disposed within hub 108 and in contact with wedge clutch plates 106. In an example embodiment, clutch 100 includes actuator 114. For a first synchronization stage for closing the wedge clutch: actuator 114 is arranged to clamp clutch plates 104 and wedge clutch plates 106; and respective portions 112A of pins 112, extending radially outward beyond outer circumference HOC of hub 108, is arranged to transmit torque between hub 108 outer carrier 102. By "clamping" we mean axially compressing and frictionally engaging clutch plates 104 and wedge clutch plates 106 so that torque transmitted by one of hub 108 or outer carrier 102 is transmitted through clamp clutch plates 104 and wedge clutch plates 106 to the other of hub 108 or outer carrier 102. Although actuator 114 is shown engaging plates 104 in FIG. 5 it should be understood that the actuator could engage plates 106 to accomplish the clamping function. That is, regardless of which plate is actually contacted by the actuator, plates 104 and 106 are clamped.

Although a particular number and configuration of pins 112 are shown in the example of FIG. 2, it should be understood that other numbers and configurations of pins 112 are possible. Actuator 114 can be any actuator known in the art. In an example embodiment, actuator 114 is a pancake solenoid actuator.

For a first synchronization stage: hub 108 is arranged to transmit force F1A, in circumferential direction CD1, to wedge clutch plates 106 through portions 112A; or, wedge clutch plates 106 are arranged to transmit force F1B, in a circumferential direction CD1, to hub 108 through portions 112A. Direction CD1 is based upon hub 108 or outer carrier 102 receiving torque in direction CD1. It should be understood that the discussion above and below applies to the case in which hub 108 or outer carrier 102 receive torque in direction CD2, with direction CD2 taking the place of direction CD1.

Figure 6:
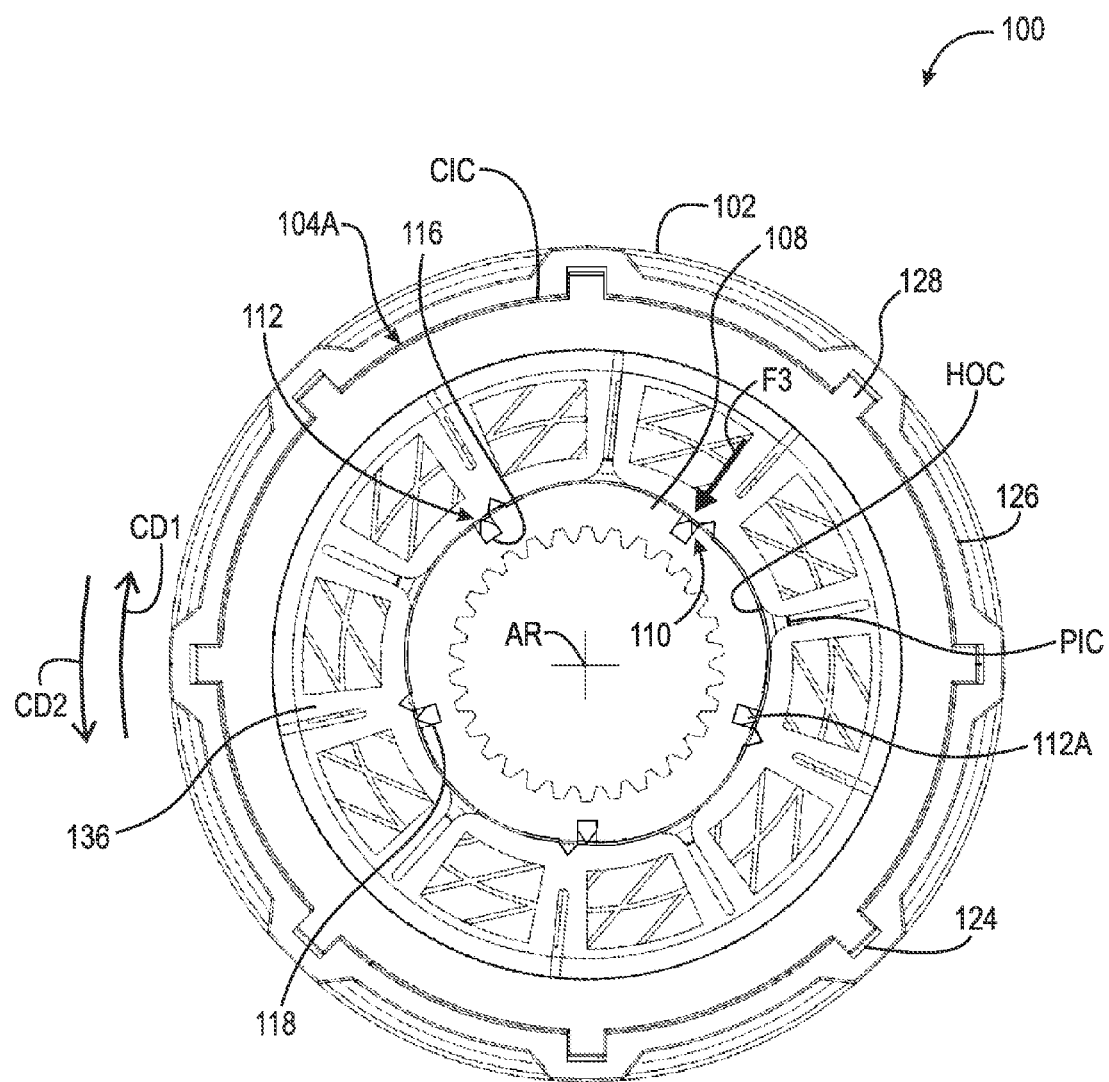
FIG. 6 is a front view of the wedge clutch in FIG. 2 in a second synchronization stage.

FIG. 6 is a front view of wedge clutch 100 in FIG. 2 in a second synchronization stage. For the second synchronization stage for closing wedge clutch 100: hub 108 and wedge clutch plates 106 are arranged to circumferentially displace with respect to each other; and wedge clutch plates 106 are arranged to displace pin 112 radially inward. Wedge clutch plates 106 are arranged to displace portions 112A radially inward so that: at least respective segments of portions 112A are radially inward of inner circumference WIC of plates 106; or respective entireties of pins 112 are radially inward of inner circumference WIC. The two possibilities are further discussed below.

As further described below, for the first sychronization stage, a magnitude of torque transmitted between hub 108 and outer carrier 102 is less than a magnitude of torque transmitted between hub 108 and outer carrier 102 in the second synchronization stage. As further described below, for the second sychronization stage: wedge clutch plates 106 are arranged to transmit torque between hub 108 and outer carrier 102; and the torque by-passes clutch plates 104.

Figure 7:
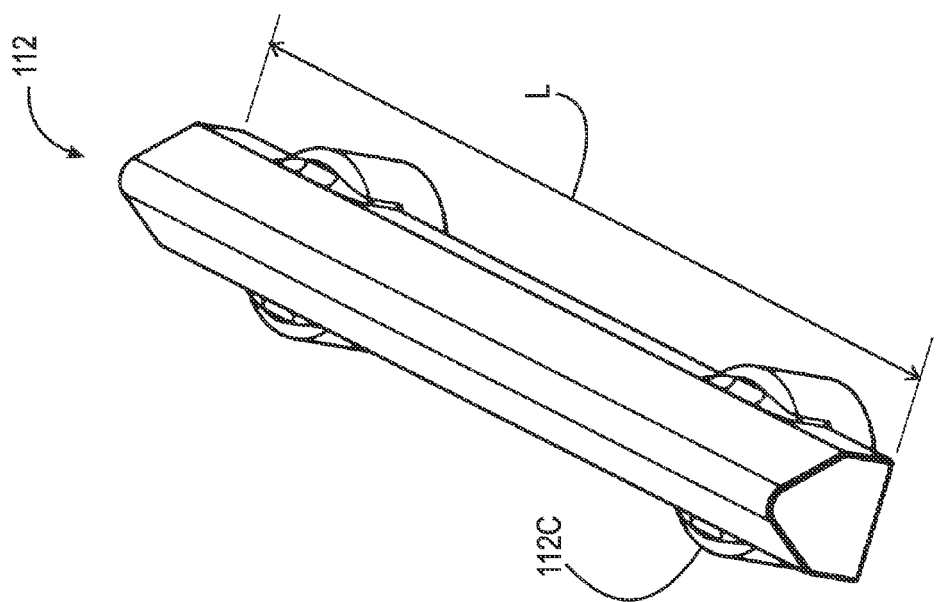
FIG. 7 is a detail of a radially inward view of a polygonal radial torsion pin in FIG. 2.

FIG. 7 is a detail of a radially inward view of a polygonal radial torsion pin in FIG. 2.

Figure 8:
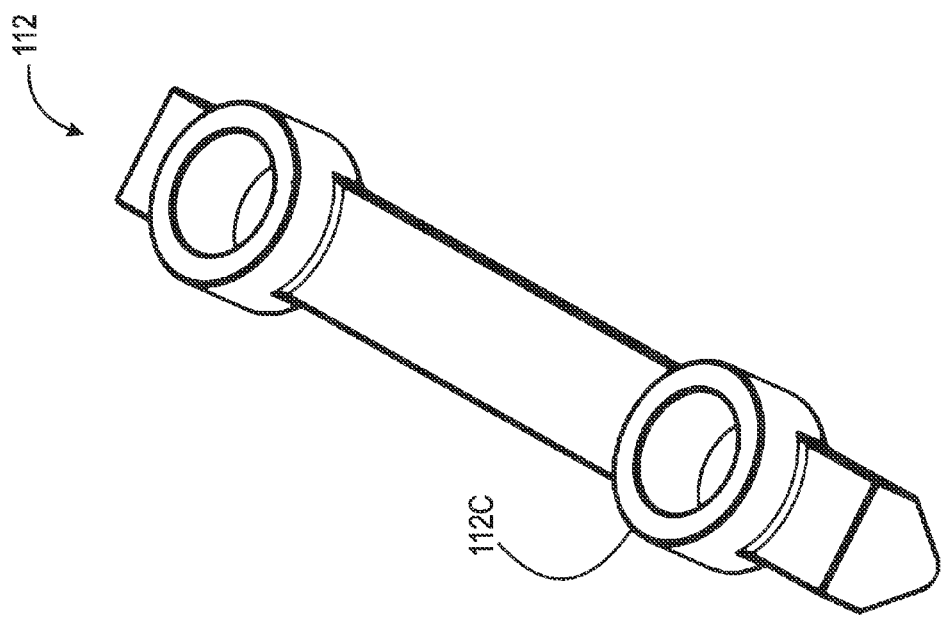
FIG. 8 is a detail of a radially outward view of the polygonal radial torsion pin in FIG. 7.

FIG. 8 is a detail of a radially outward view of the polygonal radial torsion pin in FIG. 7. The following should be viewed in light of FIGS. 2 through 8. In the example embodiment of FIG. 2, pin 112 has a polygonal shape in a cross-section formed by a plane orthogonal to axis of rotation AR (i.e., the view shown in FIG. 2).

Engagement assembly 110 includes resilient elements 116 urging pins 112 radially outward with respect to hub 108 with force F2. For the second sychronization stage, wedge clutch plates 106 exert force F3 radially inward on pin 112 and greater than force F2. That is, force F3 overcomes force F2 to push pins 112 radially inward. In the example of FIG. 2, elements 116 are coil springs and pins 112 include retainer sections 112C into which elements 116 are disposed. Resilient elements 116 can be any resilient elements known in the art.

Hub 108 includes slot 118, axially aligned, in outer circumference HOC. Respective resilient elements 116 and at least portions of respective pins 112, for example, portions 112B are disposed in the slots. Wedge clutch plates 106 include respective notches 120 in inner circumference WIC of the wedge clutch plates. In the first sychronization stage, portions 112A are disposed in notches 120. In the second sychronization stage, at least respective segments of portions 112A are disposed in slots 118. In the case in which portions 112A are not displaced completely radially inward of circumference WIC in the second synchronization stage, portions 112A remain in notches 120, although portions 112A are pushed radially inward within notches 120. In the case in which portions 112A are displaced completely radially inward of circumference WIC in the second sychronization stage, portions 112A are no longer in notches 120. Note that axial length L of pin 112 is sufficient for pin 112 to engage every wedge plate 106 when clutch 100 includes multiple plates 106.

Carrier 102 include slots 124 in inner circumference CIC of the carrier. Clutch plates 104 includes radially-extending protrusions 128 at least partially disposed in slots 124. The engagement of protrusions 128 and slots 124 non-rotatably connects carrier 102 and plates 104. Plates 104 are axially displaceable with respect to carrier 102.

In an example embodiment, carrier 102 includes circumferentially-extending slots 130 in inner circumference CIC and wedge clutch plates 106 include respective chamfered outer circumferences WOC at least partially disposed in slots 130. Wedge clutch plates 106 include circumferentially disposed and radially-extending ramps 132 on inner circumference WIC; and hub 108 includes circumferentially disposed and radially-extending ramps 134 formed on outer circumference HOC and in contact with circumferentially disposed and radially-extending ramps 132. To translate from the first sychronization stage to the second sychronization stage, ramps 132 and 134 are arranged to circumferentially displace with respect to each other to displace wedge clutch plates 106 radially outward.

Clutch 100 includes friction material 136 fixed to plates 104 or 106. For the first sychronization stage, actuator 112 is arranged to frictionally engage plates 104, plates 106, and the friction material. In the example of FIG. 2, friction material 136 is fixed to wedge plates 106. Friction material 136 can be any friction material known in the art.

Figure 9:
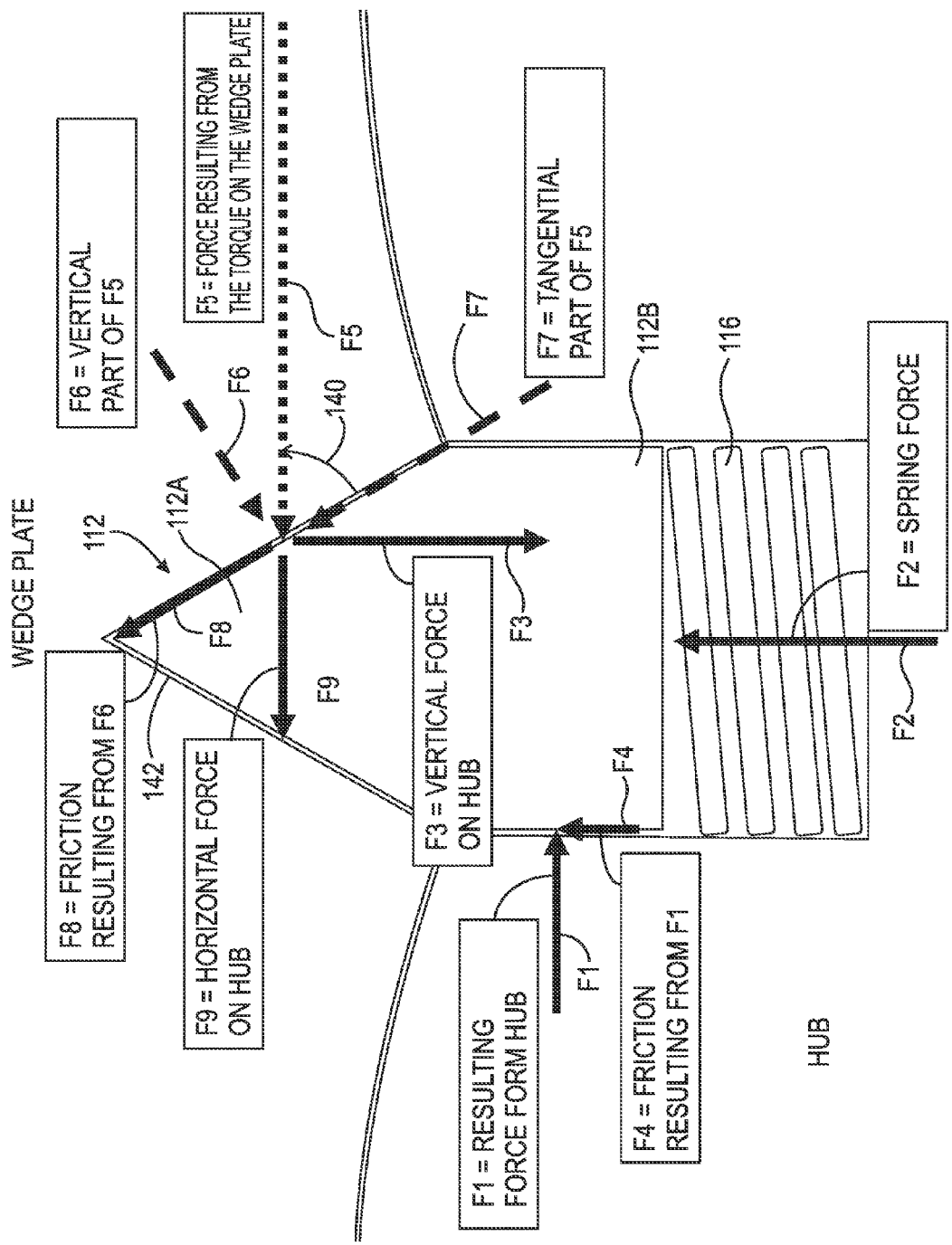
FIG. 9 is a block diagram illustrating forces acting on the polygonal radial torsion pin in FIG. 2.

FIG. 9 is a block diagram illustrating forces acting on the polygonal radial torsion pin in FIG. 2. In the example of FIG. 9, the hub is receiving torque for transmission to carrier 102, which results in force F1. Resilient element 116 generates force F2. Force F4 is friction force resulting from force F1. Force F3 is the vertical force resulting from force F5, which results from torque on the wedge plate. Force F6 is the vertical component of force F5, which results from force F5 being at acute angle 140 with respect to face 142 of pin 112. Force F7 is the tangential part of force F5, again resulting from angle 140. F8 is the friction resulting from force F6. Force F9 is the horizontal force on hub 108. In the example of FIG. 9, the trigger point (switching from first to second synchronization stage) can be set by selecting elements 116 to provide a particular force F2 and by selecting angle 140 to provide a particular force F3. For example, decreasing angle 140 will reduce the amount of force F5 needed to overcome force F2.

Figure 10:
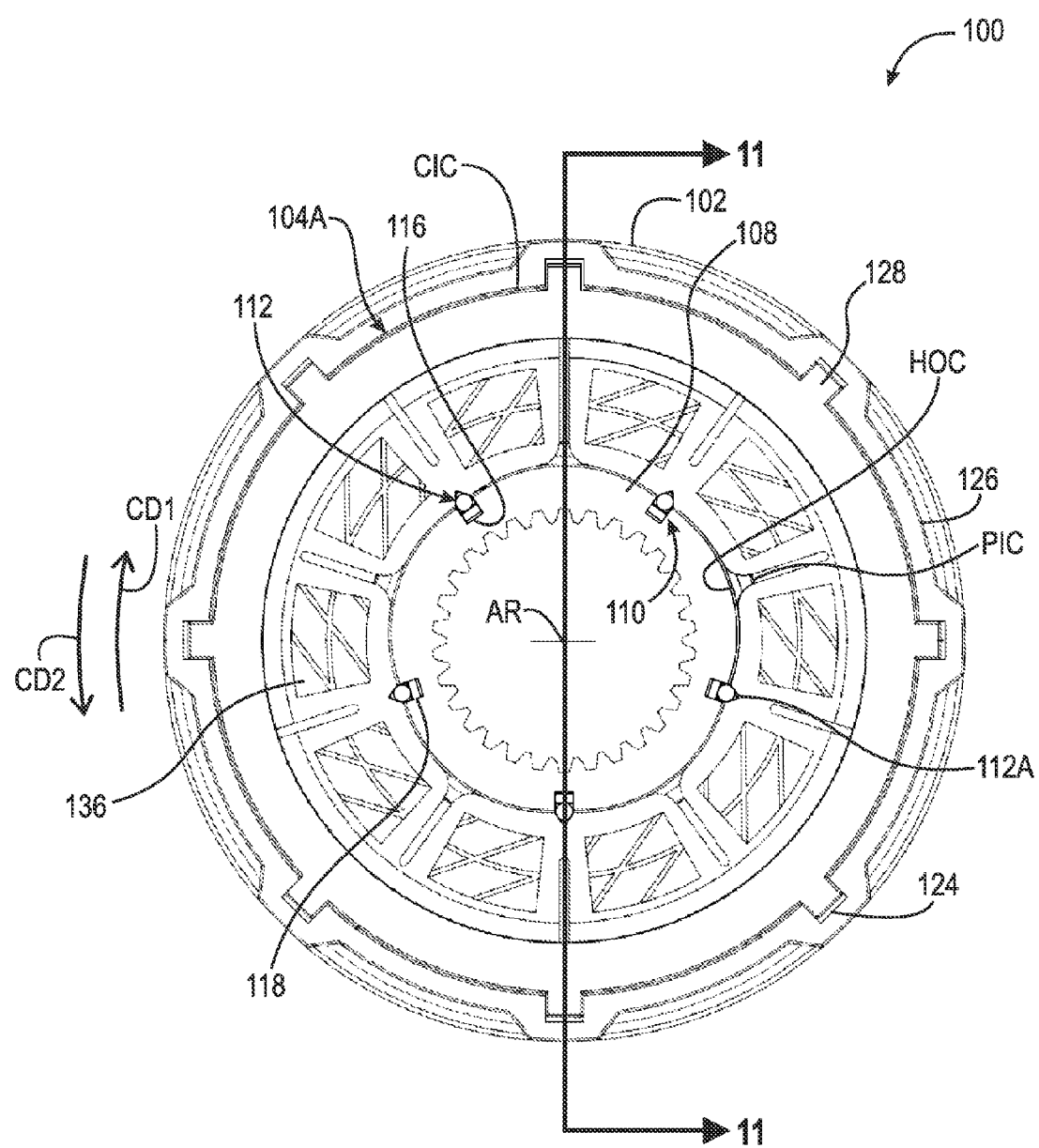
FIG. 10 is a front cut-away view of a wedge clutch with cylindrical radial torsion pins.

FIG. 10 is a front cut-away front view of wedge clutch 100 with cylindrical radial torsion pins.

Figure 11:
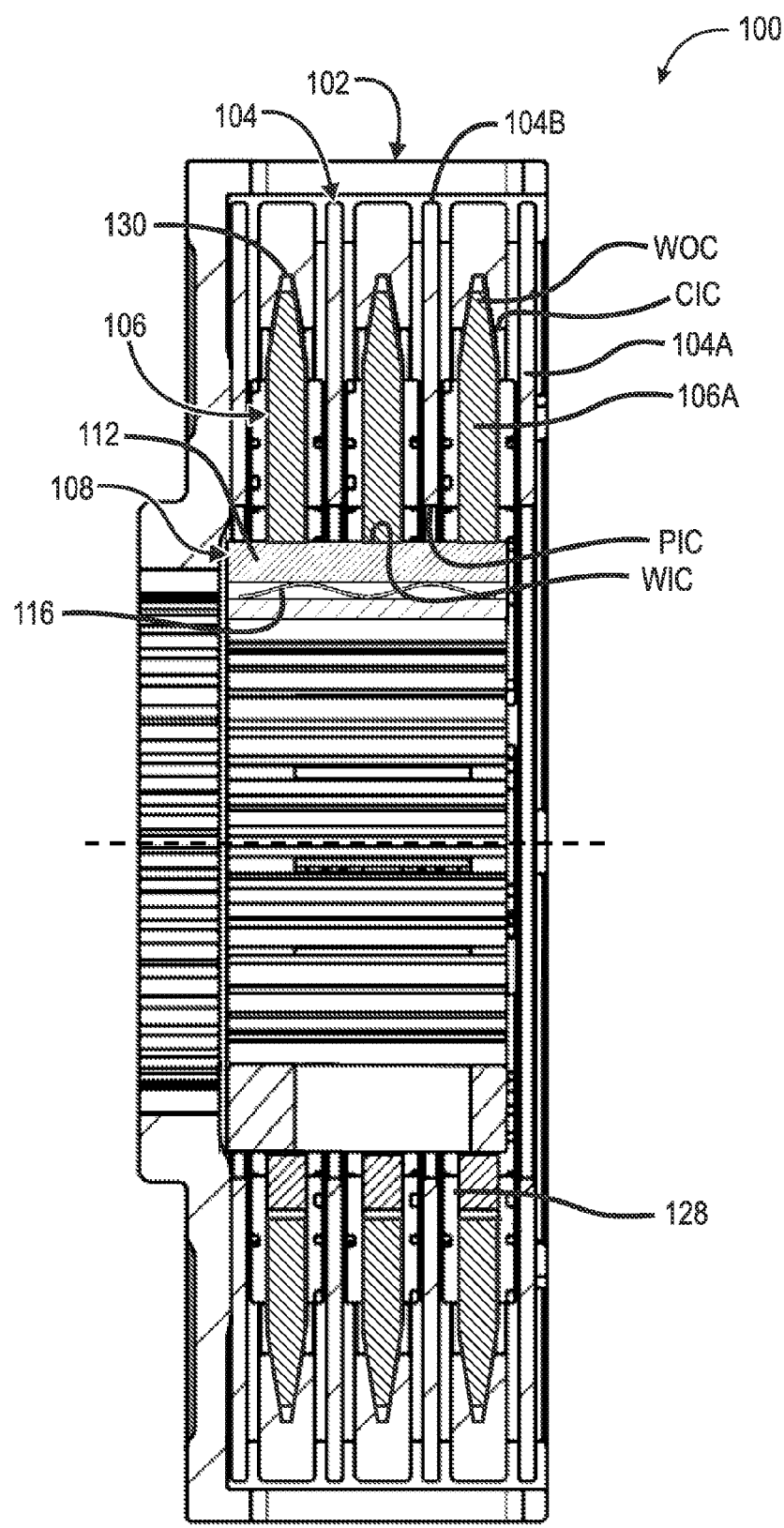
FIG. 11 is a cross-sectional view generally along line 11-11 in FIG. 10 without the cut-away.

FIG. 11 is a cross-sectional view generally along line 11-11 in FIG. 10 without the cut-away.

Figure 12:
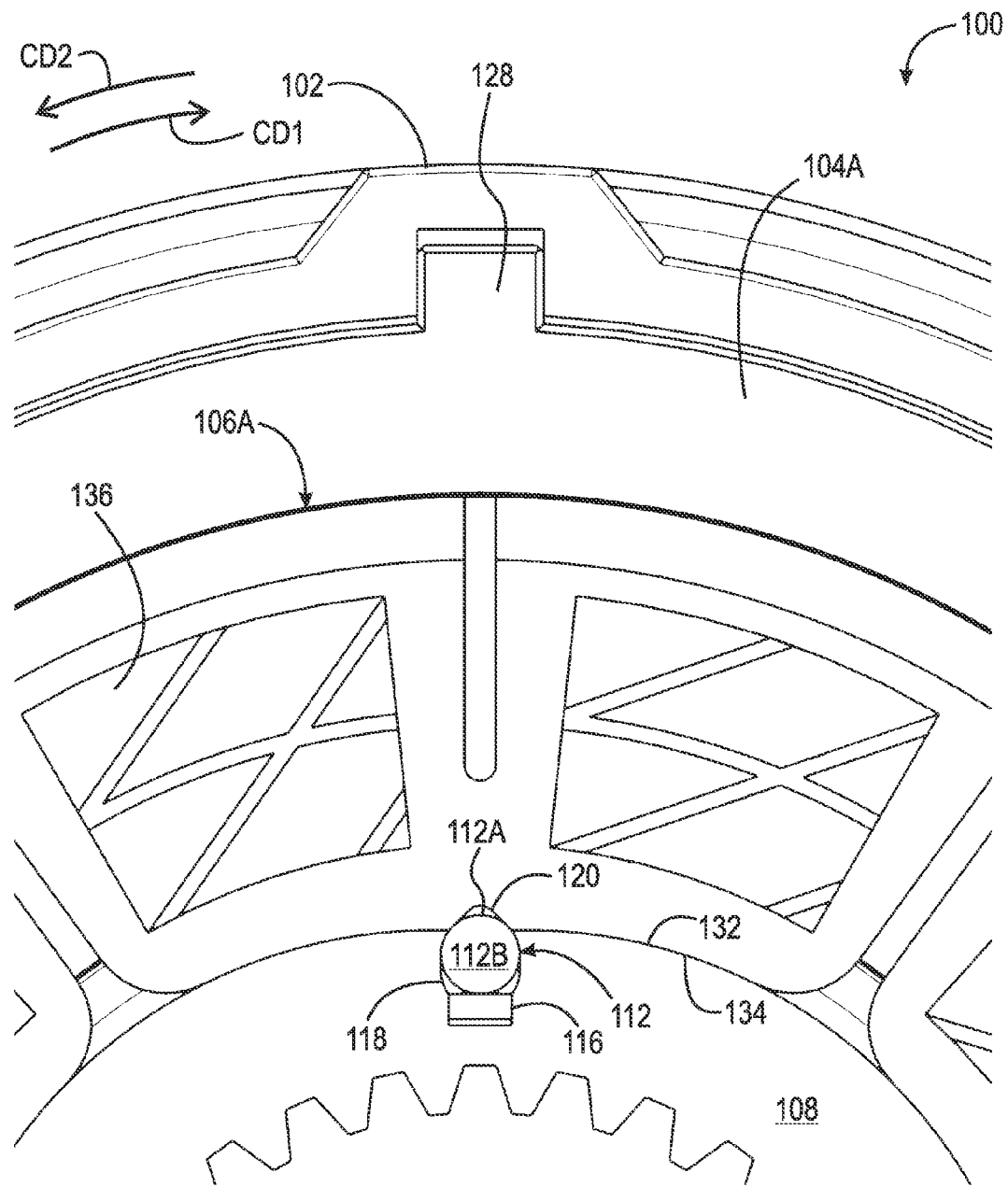
FIG. 12 is a detail of a cylindrical radial torsion pin and biasing spring shown in FIG. 12.

FIG. 12 is a detail of a cylindrical radial torsion pin and biasing spring shown in FIG. 10.

Figure 13:
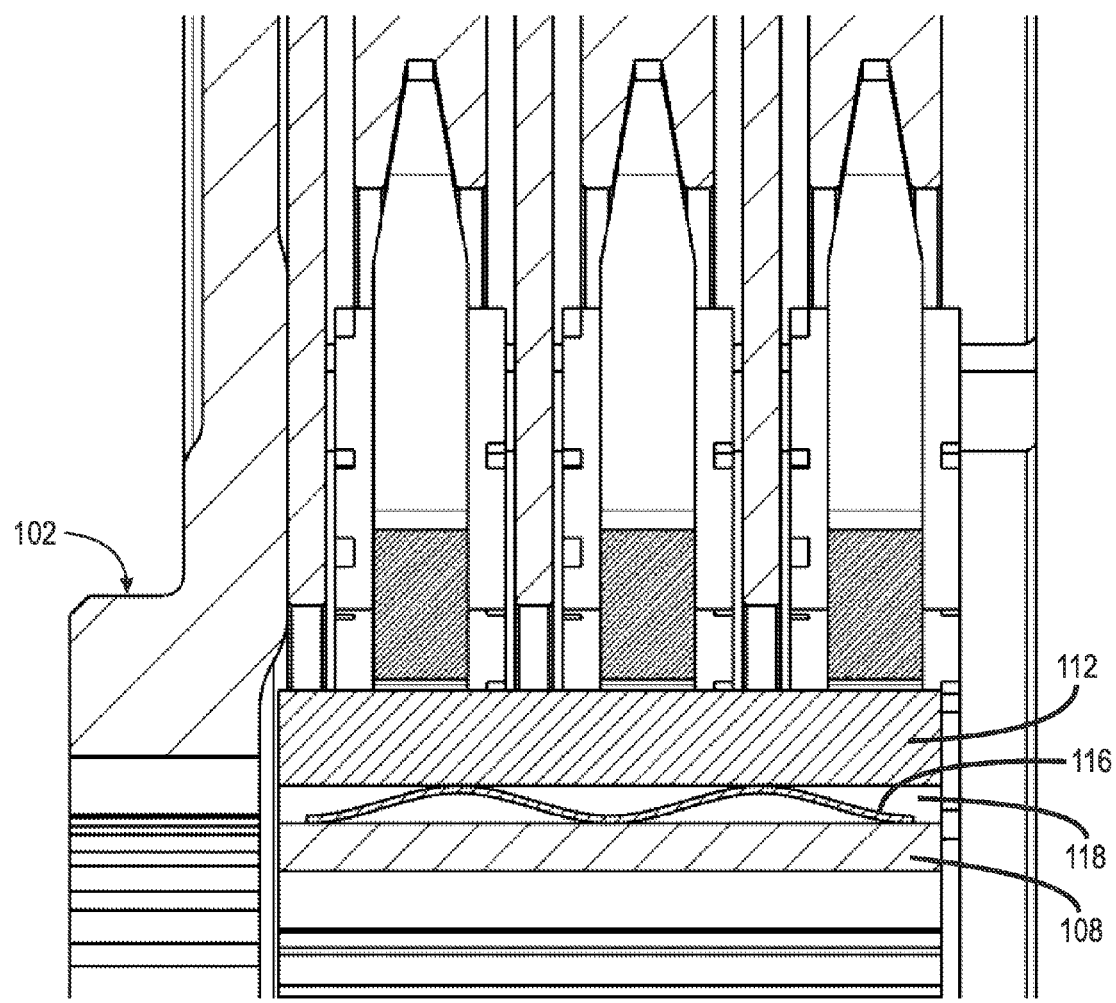
FIG. 13 is a cross-sectional detail of a cylindrical radial torsion pin and biasing spring shown in FIG. 10.

FIG. 13 is a cross-sectional detail of a cylindrical radial torsion pin and biasing spring shown in FIG. 10.

Figure 14:
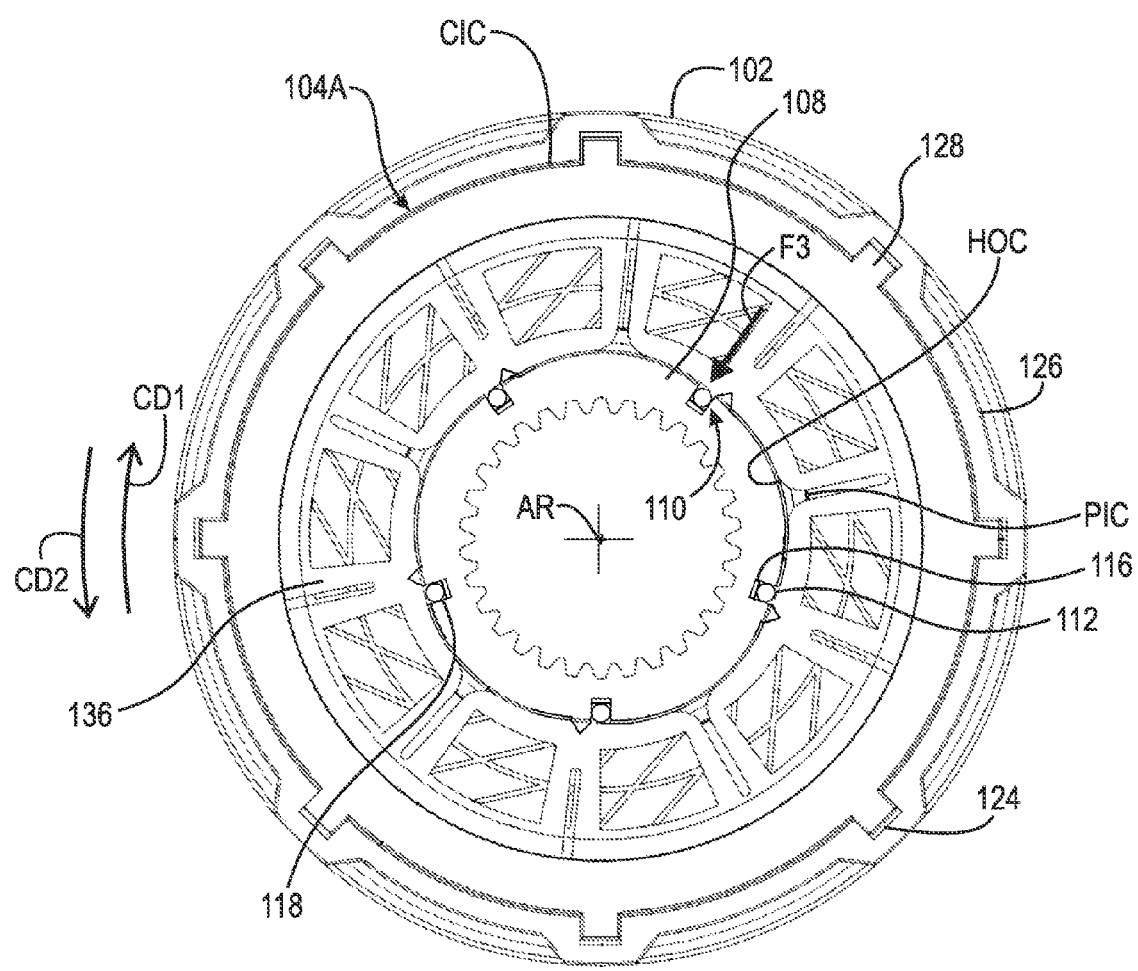
FIG. 14 is a front view of the wedge clutch in FIG. 12 in a second synchronization stage.
Figure 15:
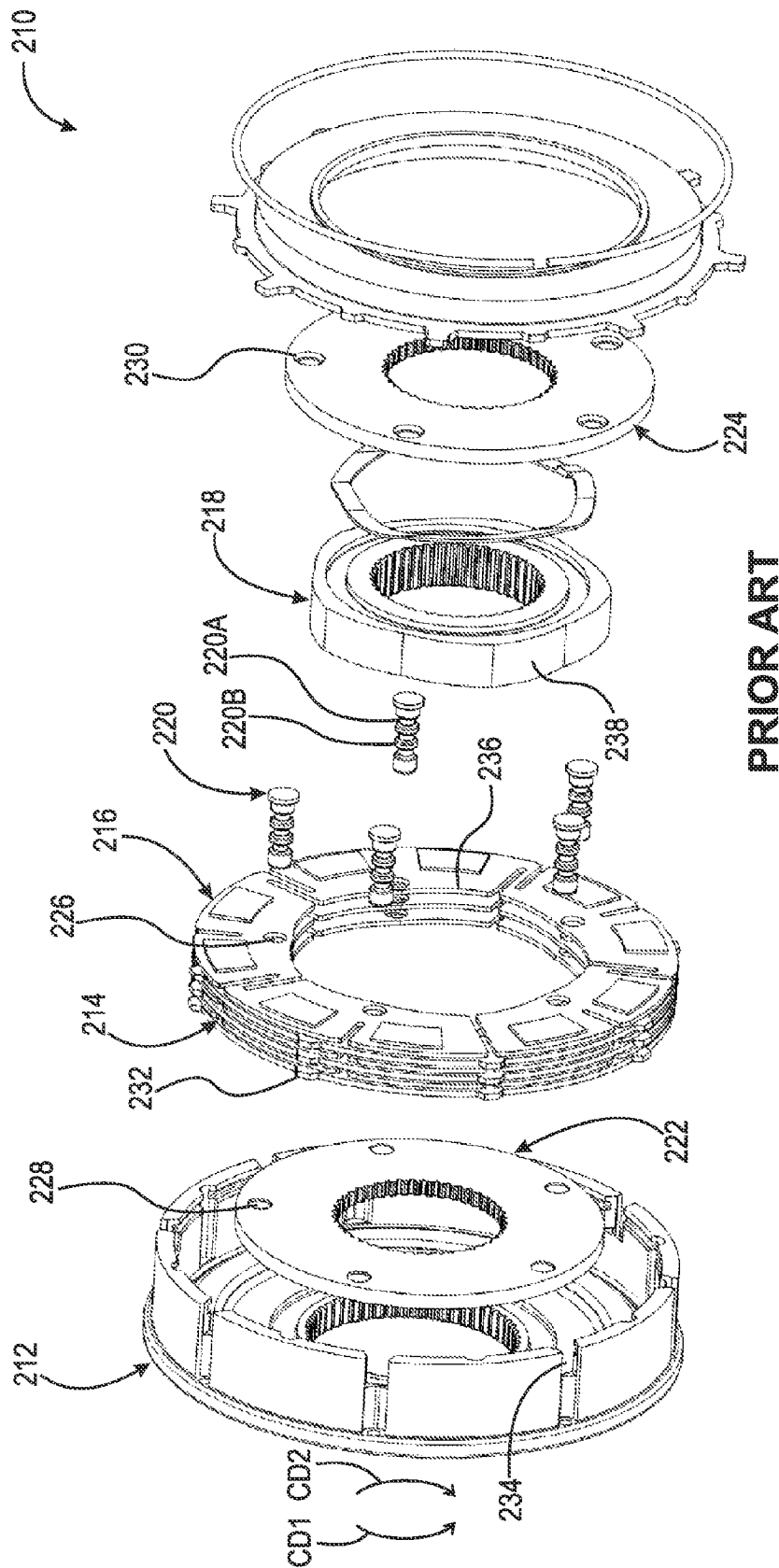
FIG. 15 is an exploded view of a prior art wedge clutch.

FIG. 14 is a front view of wedge clutch 100 in FIG. 12 in a second synchronization stage. The following should be viewed in light of FIGS. 10 through 14. The discussion for wedge clutch 100 in FIGS. 2 through 9 is applicable to wedge clutch 100 in FIGS. 10 through 14 except as noted. The components in FIG. 10 are the same as the components in FIG. 2 except: pin 112 is cylindrical; and resilient elements 116 are a wave spring. Although polygonal and cylindrical pins 112 are shown in the examples of FIGS. 2 and 10, respectively, it should be understood that other shapes for pins 112 are possible. It also should be understood that different shapes for pins 112 can be used in a same clutch 100. It also should be understood that a separate pin 112 can be used for each notch in plates 106. Although coils springs and wave springs are shown in the examples of FIGS. 2 and 10, respectively, it should be understood that other types of resilient elements, including but not limited to leaf springs and solid pieces of resilient material such as rubber, can be used.

The following provides further detail regarding operation of clutch 100. The discussion that follows is directed to hub 108 receiving torque and hub 108 transmitting the torque to carrier 102 when clutch 100 is closed. However, it should be understood that the discussion is applicable to the case in which carrier 102 receives torque for transmission to hub 108. Advantageously, there is little or no frictional contact between plates 106 and carrier 102 when clutch 100 is open. Thus, there is little or no drag friction and subsequent losses in efficiency. However, a mechanism is required to implement the closing and opening of clutch 100. This mechanism is centered around pins 112.

As noted above, to initiate closing of clutch 100 (first synchronizing stage), actuator 114 clamps plates 104 and 106 so that plates 104 and 106 are frictionally engaged and generally rotate in unison (some slipping is possible) to transmit torque from hub 108 to carrier 102. During the first stage, pins 112 are disposed in notches 120 of wedge plates 106, non-rotatably connecting hub 108 to plates 106. Thus, ramps 132 and 134 do not slide across each other and plates 106 do not expand radially outward. Pins 112 are urged radially outward into notches 120 by elements 116 with force F2. As long as F2 is greater than force F3 generated by the interaction of wedge plates 106 with pins 112, pins non-rotatably connect hub 108 and plates 106.

However, as torque from hub 108 increases, force F3, from force F5, equals and then surpasses force F2 and hub 108 begins to rotate with respect to plates 106 (force F5 essentially blocks rotation of plates 106) and plates 106 push pins 112 radially inward. As hub 108 begins to rotate with respect to plates 106, ramps 134 begin to slide on ramps 132. In the present example, hub 108 is rotating and transmitting torque in direction CD1. As seen in FIG. 12, ramps 132 expand radially inward in direction CD2 and ramps 134 extend radially outward in direction CD1. Thus, as hub 108 rotates in direction CD1 with respect to plates 106 due to force F5, the radially outwardly expanding portions of ramps 134 slide along the radially inwardly expanding portions of ramps 132, displacing plates 106 radially outward.

When plates 106 are sufficiently radially expanded, plates 106 non-rotatably connect to hub 108 and carrier 104. At this point, the clamping of plates 104 and 106 is no longer needed and actuator 114 can be de-activated, reducing the energy requirements for clutch 100. The particular configuration of ramps 132 and 134 determines the extent to which pins 112 are displaced radially inward. For example, the relative slope of ramps 132 and 134 can be such that the required rotation of hub 108 with respect to plates 106 causes plates 106 to displace all of portion 112A radially inward of WIC for plates 106. For example, the relative slope of ramps 132 and 134 can be such that the required rotation of hub 108 with respect to plates 106 is less than the amount needed for plates 106 to displace all of portion 112A radially inward of WIC for plates 106.

Advantageously, clutch 100 only requires a single actuator in comparison to the two actuators needed for prior art clutch 210. Thus, the cost, complexity, size, and energy requirements for clutch 100 are less than those of clutch 210. Further, the operation of clutch 100 is simpler and more reliable. The simplified control scheme for clutch 100 only requires the operation of a single actuator, not two actuators. Further, mechanical resilient elements 116 are more robust and reliable than the second electric, hydraulic or pneumatic actuator needed for clutch 210.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A wedge clutch, comprising:
   an outer carrier;
   a first clutch plate non-rotatably connected to the outer carrier;
   a wedge clutch plate;
   a hub radially inward of the outer carrier;
   an engagement assembly including a pin partially disposed within the hub and in contact with the wedge clutch plate; and,
   an actuator, wherein:
      for a first synchronization stage for closing the wedge clutch:
         the actuator is arranged to clamp the first clutch plate and the wedge clutch plate; and,
         a first portion of the pin extending radially outward beyond an outer circumference of the hub is arranged to transmit torque between the hub and the outer carrier; and,
      for a second synchronization stage for closing the wedge clutch:
         the hub or the wedge clutch plate are arranged to circumferentially displace with respect to each other; and,
         the wedge clutch plate is arranged to displace the pin radially inward.

2. The wedge clutch of claim 1, wherein for the first synchronization stage:
   the hub is arranged to transmit force, in a circumferential direction, to the wedge clutch plate through the first portion of the pin; or,
   the wedge clutch plate is arranged to transmit force, in a circumferential direction, to the hub through the first portion of the pin.

3. The wedge clutch of claim 1, wherein for the second sychronization stage, the wedge clutch plate is arranged to displace the first portion of the pin radially inward so that:
   at least a segment of the first portion is radially inward of an inner circumference of the wedge clutch plate; or,
   an entirety of the pin is radially inward of an inner circumference of the wedge clutch plate.

4. The wedge clutch of claim 1, wherein for the first sychronization stage, a magnitude of first torque transmitted between the hub and the outer carrier is less than a magnitude of second torque transmitted between the hub and the outer carrier in the second sychronization stage.

5. The wedge clutch of claim 1, wherein for the second sychronization stage:
   the wedge clutch plate is arranged to transmit torque between the hub and the carrier; and,
   the torque by-passes the first clutch plate.

6. The wedge clutch of claim 1, wherein:
the engagement assembly includes a resilient element urging the pin radially outward with respect to the hub with a first force; and,
for the second sychronization stage, the wedge clutch plate exerts a second force:
radially inward on the pin; and,
greater than the first force.

7. The wedge clutch of claim 6, wherein:
the hub includes a slot, axially aligned, in the outer circumference of the hub;
the resilient element and a second portion of the pin are disposed in the slot;
the wedge clutch plate includes a notch in an inner circumference of the wedge clutch plate;
in the first sychronization stage, the first portion of the pin is disposed in the notch; and,
in the second sychronization stage, at least a segment of the first portion is disposed in the slot.

8. The wedge clutch of claim 1, wherein:
the carrier includes a plurality of slots in an inner circumference of the carrier; and,
the first clutch plate includes a plurality of radially-extending protrusions at least partially disposed in the plurality of slots.

9. The wedge clutch of claim 1, wherein:
the outer carrier includes a circumferentially-extending slot in an inner circumference of the carrier;
the wedge clutch plate includes:
a chamfered outer circumference at least partially disposed in the slot; and,
a first plurality of circumferentially disposed and radially-extending ramps formed on an inner circumference of the wedge clutch plate;
the hub includes a second plurality of circumferentially disposed and radially-extending ramps:
formed on the outer circumference of the hub; and,
in contact with the first plurality of circumferentially disposed and radially-extending ramps; and,
to translate from the first sychronization stage to the second sychronization stage the first and second pluralities of circumferentially disposed and radially-extending ramps are arranged to circumferentially displace with respect to each other to displace the wedge clutch plate radially outward.

10. The wedge clutch of claim 1, further comprising:
friction material fixed to one of the first clutch plate or the wedge clutch plate; and,
for the first sychronization stage, the actuator is arranged to frictionally engage the other of the first clutch plate or the wedge clutch plate with the friction material.

11. The wedge clutch of claim 1, wherein:
the pin has a circular or arcuate shape in a cross-section formed by a plane orthogonal to the axis of rotation; or,
the pin has a polygonal shape in a cross-section formed by a plane orthogonal to the axis of rotation.

12. The wedge clutch of claim 1, wherein for the second sychronization stage, the first clutch plate and the wedge clutch plate are not frictionally engaged.

13. The wedge clutch of claim 1, wherein the wedge clutch is free of an actuator arranged to apply:
a radial force to the pin; or,
a circumferential or radial force to the wedge clutch plate.

14. A wedge clutch, comprising:
an axis of rotation;
an outer carrier;
a first clutch plate non-rotatably connected to the outer carrier;
a wedge clutch plate;
a hub radially inward of the outer carrier; and,
an engagement assembly including:
a pin non-rotatably connected to the hub and engaged with the wedge clutch plate; and,
an actuator arranged to, for a first synchronization stage for closing the wedge clutch, clamp the first clutch plate and the wedge clutch plate, wherein:
during the first synchronization stage, the pin is arranged to non-rotatably connect the hub and the wedge clutch plate; and,
for a second synchronization stage for closing the wedge clutch, the wedge clutch plate is arranged to apply a first force urging the pin radially inward.

15. The wedge clutch of claim 14, wherein for the second synchronization stage:
the wedge clutch plate is arranged to circumferentially displace with respect to the hub to apply the first force; and,
the wedge clutch plate is arranged to expand radially outward to non-rotatably connect to the hub and the carrier.

16. The wedge clutch of claim 14, wherein:
the hub includes a slot, axially aligned, in an outer circumference of the hub;
the engagement assembly includes a resilient element disposed in the slot and urging the pin radially outward;
the wedge clutch plate includes a notch in an inner circumference of the wedge clutch plate; and,
in the first sychronization stage, a portion of the pin is disposed in the notch.

17. The wedge clutch of claim 14, wherein for the first synchronization stage:
the hub is arranged to transmit force, in a circumferential direction, to the wedge clutch plate through a portion of the pin radially outward of an outer circumference for the hub; or,
the wedge clutch plate is arranged to transmit force, in a circumferential direction, to the hub through a portion of the pin radially outward of an outer circumference for the hub.

18. The wedge clutch of claim 14, wherein:
for the first synchronization stage, a portion of the pin is radially outward of an outer circumference for the hub; and,
for the second synchronization stage, the wedge clutch plate is arranged to displace the portion of the pin radially inward so that:
at least a segment of the portion is radially inward of an inner circumference of the wedge clutch plate; or,
an entirety of the pin is radially inward of an inner circumference of the wedge clutch plate.

19. The wedge clutch of claim 14, wherein for the first sychronization stage, a magnitude of first torque transmitted between the hub and the carrier is less than a magnitude of second torque transmitted between the hub and the outer carrier.

20. A wedge clutch, comprising:
an axis of rotation;
an outer carrier;
a first clutch plate non-rotatably connected to the outer carrier;

a wedge clutch plate including a notch in an inner circumference for the wedge clutch plate;
a hub radially inward of the outer carrier and including a slot, axially aligned, in an outer circumference for the hub; and,
an engagement assembly including:
  a pin including at least a portion disposed in the slot;
  a resilient element disposed in the slot and urging the pin radially outward; and,
  an actuator arranged to for a first synchronization stage for closing the wedge clutch, clamp the first clutch plate and the wedge clutch plate so that the first clutch plate and the wedge clutch plate transmit torque between the hub and the carrier, wherein:
for the first synchronization stage, the pin is disposed in the notch to non-rotatably connect the hub and the wedge clutch plate; and,
for a second synchronization stage for closing the wedge clutch:
  the wedge plate is arranged to apply a force, in a circumferential direction, to a portion of the pin radially outward of the outer circumference for the hub;
  the force is arranged to displace the pin radially inward; and,
  as the pin displaces radially inward, the wedge clutch plate is arranged to circumferentially displace with respect to the hub to non-rotatably connect to the hub and the carrier.

* * * * *